Patented Apr. 7, 1936

2,036,870

UNITED STATES PATENT OFFICE 2,036,870

FERTILIZERS AND PROCESS FOR THEIR PRODUCTION

Edward W. Harvey, New Brunswick, N. J., assignor to The Barrett Company, New York, N. Y., a corporation of New Jersey No Drawing. Application September 15, 1932, Serial No. 633,270

12 Claims. (Cl. 71—9)

This application is a continuation in part of my co-pending United States patent application Serial No. 420,008, filed January 10, 1930.

This invention relates to fertilizers and particularly to fertilizer mixtures produced from a monocalcium acid phosphate material. Superphosphate, double superphosphate and mixtures containing one or both of the same are examples of monocalcium acid phosphate materials.

Superphosphate, for example, is frequently a constituent of fertilizer mixtures. This material supplies the $P_2O_5$ which is desirable as a plant food. Nitrogen is also a desirable plant food in fertilizers and, in order to prepare materials containing both $P_2O_5$ and nitrogen, it has heretofore been proposed to absorb ammonia in superphosphate. A difficulty with such a method of preparation of a fertilizer arises from the fact that when relatively large amounts of ammonia are added to a superphosphate it causes available $P_2O_5$ (water soluble and citrate soluble $P_2O_5$) to revert to a citrate insoluble form which is not considered available as a plant food. There is, therefore, a limitation in the amount of nitrogen which may practically be added to superphosphate by means of treating it with ammonia. Urea is a highly concentrated nitrogen-containing material. It has also been proposed to introduce urea into fertilizers containing a superphosphate but the difficulties encountered with the fertilizers thus produced are that they are hygroscopic, become sticky and are not satisfactory with respect to their physical character.

It is an object of this invention to provide a fertilizer containing a superphosphate and nitrogen, in which the nitrogen may be present in relatively large amounts, which retains a dry-to-the-touch free-flowing character when exposed to an atmosphere containing the humidities usually encountered, for long periods of time. It is a further object of this invention to prepare a mixed fertilizer containing urea in which the urea is substantially uniformly distributed throughout the material and is not concentrated in parts of the product so as to render those portions hygroscopic. It is likewise an object of this invention to provide a process for the production of fertilizers from superphosphate materials which contain relatively large proportions of nitrogen and in which the fertilizing value of the phosphate is not excessively diminished.

In preparing fertilizers in accordance with the process of this invention superphosphate or triple superphosphate, for example, may be mixed with finely divided solid urea and the mixture treated with ammonia, preferably in the form of aqua ammonia. The ammonia may also be advantageously employed in the form of liquid anhydrous ammonia, particularly when triple superphosphate is a constituent of the fertilizer mixture. The fertilizer may conveniently be prepared by simultaneously mixing the ammonia, urea and superphosphate material or, if desired, the solid materials may first be mixed in the usual mixing machines used in fertilizer practice and the ammonia may then rapidly be introduced into the mixer and disseminated throughout the mass of solid material by continuing the mixing operation during and for a short time after the introduction of the ammonia.

This invention may likewise be utilized in the production of fertilizers by introducing a solution of urea in aqua or anhydrous liquid ammonia into a mixer in which superphosphate is being agitated or in which superphosphate is being admixed with other desirable constituents of a complete fertilizer such as potassium salts, fillers and the like. It is particularly advantageous to employ the ammonia in sufficient amount to react with substantially all of the water soluble phosphates in the superphosphate (free phosphoric acid or monocalcium acid phosphate) to form di-ammonium phosphate. This di-ammonium phosphate may, however, react with other constituents of the materials and, in the case of treating superphosphate, it appears in fact to react with the calcium sulfate which is present in superphosphate so that the ammonia added eventually is converted into ammonium sulfate with the formation of water insoluble dicalcium phosphate which, however, is citrate soluble and hence available to plants.

The following examples are illustrative of processes for the production of fertilizers in accordance with my invention but the scope of the invention is not limited to the exact details set forth.

Example I

The following materials are introduced into a mixing machine and thoroughly intermixed with one another:

| | Parts |
|---|---|
| Superphosphate | 47 |
| Urea | 8 |
| Potassium sulfate | 14 |
| Filler (sand) | 25 |

To the mixed materials about 6 parts of 25% aqua ammonia are added while the mixing is continued to thoroughly disseminate the ammonia throughout the solid material. The ammonia liquor may be introduced in the form of a spray applied to the solids undergoing agitation.

Example II

The following materials are admixed:

| | Parts |
|---|---|
| Triple superphosphate | 35 |
| Urea | 19 |
| Potassium sulfate | 28 |
| Filler (sand) | 12½ | and the mixture treated with about 6 parts of ammonia liquor containing 25% $NH_3$.

Fertilizers may be prepared in accordance with this invention by mixing the solid ingredients of the following examples and treating the mixture with the ammoniacal liquid given in each example, preferably by spraying the liquid on the mixture of solids while it is being agitated. Instead of first mixing the solid materials, they may be simultaneously treated with the ammoniacal liquid while being admixed or the superphosphate may be treated with the ammoniacal liquid and the resulting material admixed with the remaining constituents of the examples.

Example III

| | Parts |
|---|---|
| Superphosphate | 47 |
| Sulfate of ammonia | 8 |
| Potassium chloride | 14 |
| Urea | 4 |
| Filler | 21 | treated with about 6 parts of aqua ammonia containing 25% $NH_3$.

Example IV

| | Parts |
|---|---|
| Superphosphate | 47 |
| Sulfate of ammonia | 6 |
| Potassium chloride | 14 |
| Urea | 4 |
| Filler | 25 | treated with about 4 parts of aqua ammonia containing 50% $NH_3$.

Example V

| | Parts |
|---|---|
| Superphosphate | 47 |
| Sulfate of ammonia | 6 |
| Potassium chloride | 14 |
| Urea | 4 |
| Filler | 24 | treated with about 2 parts of anhydrous liquid ammonia.

Example VI

| | Parts |
|---|---|
| Superphosphate | 47 |
| Sulfate of ammonia | 10 |
| Potassium chloride | 14 |
| Filler (sand) | 26 | treated with about 3 parts of a solution of urea in anhydrous liquid ammonia containing about 1 part of urea for every 2 parts of ammonia.

Example VII

| | Parts |
|---|---|
| Superphosphate | 47 |
| Sulfate of ammonia | 8 |
| Potassium chloride | 14 |
| Filler (sand) | 25 | treated with about 6 parts of a solution of urea, ammonia and water containing about equal proportions of the three constituents of the solution.

Example VIII

| | Parts |
|---|---|
| Superphosphate | 47 |
| Potassium chloride | 14 |
| Urea | 2 |
| Sodium nitrate | 5 |
| Filler | 30 | treated with about 2 parts of liquid anhydrous ammonia.

Example IX

| | Parts |
|---|---|
| Superphosphate | 47 |
| Potassium chloride | 14 |
| Urea | 2 |
| Sodium nitrate | 5 |
| Ammonium sulfate | 4 |
| Filler | 26 | treated with about 2 parts of liquid anhydrous ammonia.

In the foregoing examples the filler may consist of sand or a filler may be employed which contains, in addition to or in place of sand, peat, peanut meal, cocoa shell meal, garbage tankage, etc. Organic materials such as cottonseed meal, fish scrap, tankage, blood, etc., may also be employed in preparing fertilizer mixtures in accordance with the process of this invention.

In preparing a fertilizer in accordance with this invention it is preferred to employ the ammonia in sufficient amount to react with the free phosphoric acid and the monocalcium phosphate in the superphosphate or triple superphosphate to form di-ammonium phosphate. Urea is a basic substance and has the property of combining with acidic materials. By employing sufficient ammonia to react with the acidic constituents of the superphosphates a combination of urea and these constituents appears to be prevented or, if the urea is first mixed with the superphosphate and the ammonia subsequently added, the ammonia acting as a stronger base than the urea may displace the urea from its combination. In either mode of operation, i. e., whether the urea be first added to the superphosphate and then the ammonia introduced, or whether the ammonia be added simultaneously with or prior to the addition of the urea, the urea in the resulting product appears to be in a free condition and this is believed to be an important factor in obtaining a product which is non-hygroscopic, retains a granular condition for long periods of time and is stable with respect to its nitrogen content. It should be noted that by the addition of urea itself to superphosphate the acid character of the superphosphate may be destroyed in a greater or less degree depending upon the amount of urea used. In carrying out the process of this invention, therefore, in the modification just described, where the amount of ammonia is sufficient to form di-ammonium phosphate with the acidic phosphate constituents, the ammonia is added in amount greater than would be necessary to merely neutralize the free acidity of the superphosphate left after the addition of the urea.

Instead of employing the ammonia in amount sufficient to form di-ammonium phosphate I have found a smaller amount of ammonia may be used and a product of the desired character may be obtained by utilizing an ammoniacal liquid, for example, aqua ammonia or liquid anhydrous ammonia, in the treatment of mixtures of urea and superphosphate or by adding the urea to the superphosphate in solution in these ammoniacal liquids. Since in compounding mixed fertilizers relatively small amounts of urea are employed as compared with the amount of superphosphate and other solid material with which it is to be admixed, it has been found particularly difficult to obtain a satisfactorily uniform distribution of the urea. By introducing the urea as a solution of it in liquid anhydrous ammonia or in aqua ammonia its distribution throughout the mass of material is greatly facilitated. The relatively high solubility of the urea in aqua ammonia or anhydrous liquid ammonia also permits of securing a sufficiently uniform distribution of the urea by treating a mixture of the solid components of the fertilizer including solid finely divided urea with the ammoniacal liquid.

Urea itself is hygroscopic, although it is less hygroscopic than its reaction products with superphosphate materials when ammonia is not also present. It is particularly desirable, therefore, to obtain uniform distribution of the urea since, if it is segregated to any considerable degree in portions of the mixed fertilizer, it will tend to form "wet spots" in the fertilizer, which make it undesirable for distribution to the trade. By distributing the urea to the mixture employing an ammoniacal liquid as a vehicle for this distribution, not only will the urea be well distributed throughout the mass but, as the ammonia reacts with the acidic constituents of the mixture, ammonium salts will be formed which will deposit in admixture with the urea and thus improve the quality of the product.

It is also possible to employ the process of this invention to advantage in the preparation of fertilizers containing urease constituents by employing the ammonia in the form either of, for example, liquid anhydrous ammonia or of a relatively concentrated aqua ammonia containing, for example, 50% $NH_3$. By employing these concentrated ammoniacal liquids the heat evolved in the reaction of the ammonia with the phosphate material is sufficient to heat the mixed materials to a temperature sufficiently high to destroy the urease which may be present without attaining, however, a high enough temperature to materially deleteriously affect the availability of the $P_2O_5$ in the ammoniated material.

Numerous modifications and changes may be made in the processes described above without departing from the scope of this invention. Fertilizers prepared in accordance with my invention may contain any of the usual constituents of mixed fertilizers such as potassium salts (potassium chloride, potassium sulfate, potassium nitrate), ammonium sulfate, sodium nitrate, calcium nitrate, ammonium phosphate. These materials together with the urea may be added to the superphosphate and mixed therewith in the dry state and the mixture then treated with the ammonia, or the urea may be added in solution in an ammoniacal liquid to the remaining solid constituents of the mixture either after the solids have been admixed or simultaneously with the mixing operation, or the desired additional salts such as ammonium sulfate, ammonium nitrate, calcium nitrate, which are soluble in ammoniacal solutions of urea, may be introduced in the form of a solution in the urea-ammonia liquid.

The fertilizers of the examples given above, comprising ammoniated superphosphate and the indicated soluble fertilizer salts, such as ammonium sulfate, potassium chloride, sodium nitrate and urea, are all of high value since they contain the three fertilizer ingredients phosphorous, nitrogen and potassium. The fertilizers of Examples VIII and IX are particularly of value with respect to their nitrogen content since they contain the nitrogen in the three forms of ammoniacal nitrogen, nitrate nitrogen and amide nitrogen. The nitrate nitrogen is especially desirable because of its quick action and promotes rapid early growth of the plants. The nitrogen in the form of ammonia is somewhat slower acting and is in a form in which it is not quickly leached out of the soil, while the nitrogen in the form of urea, is somewhat more lasting even than the ammonium nitrogen and is in the form of an organic compound which is considered highly desirable.

I claim:

1. The process of producing a fertilizer which comprises treating a material containing monocalcium acid phosphate with an ammoniacal solution of urea.

2. The process of producing a fertilizer which comprises admixing a solution of urea in anhydrous liquid ammonia with a material containing monocalcium acid phosphate.

3. The process of producing a fertilizer which comprises treating superphosphate with an ammoniacal liquor containing urea in solution therein.

4. The process of producing a fertilizer which comprises mixing a solution of urea in aqua ammonia with a material containing superphosphate.

5. A superphosphate nitrifying agent comprising a liquid containing dissolved free ammonia and urea.

6. Process for the production of a fertilizer which comprises incorporating a solution of urea and free ammonia with a superphosphate.

7. A superphosphate nitrifying agent comprising a liquid containing in solution free ammonia, urea, and water.

8. A process for the production of fertilizer which comprises incorporating with a superphosphate a liquid containing dissolved free ammonia and urea.

9. A process for the production of fertilizer which comprises incorporating with a superphosphate a liquid containing free ammonia, urea and water in solution.

10. The process of producing a fertilizer which comprises treating superphosphate with a solution of urea in anhydrous liquid ammonia.

11. The process for the production of fertilizers which comprises mixing superphosphate with a solution of urea and free ammonia containing about 1 to 2 parts of ammonia for every 1 part of urea.

12. A superphosphate nitrifying agent comprising a solution of urea in anhydrous liquid ammonia.

EDWARD W. HARVEY.